United States Patent [19]

Bédu et al.

[11] Patent Number: 4,507,606

[45] Date of Patent: Mar. 26, 1985

[54] DEVICE FOR MEASURING THE VARIATIONS IN THE GAIN OF A LASER AMPLIFIER AS A FUNCTION OF THE PUMPING ENERGY AND A PROCESS UTILIZING THIS DEVICE

[75] Inventors: Marcel Bédu, Clamart; Thierry Rousseau, Neuilly sur Marne, both of France

[73] Assignee: Commissariat a l'Energie Atomigue, Paris, France

[21] Appl. No.: 365,158

[22] Filed: Apr. 5, 1982

[30] Foreign Application Priority Data

Apr. 6, 1981 [FR] France ............................ 81 06857

[51] Int. Cl.³ .......................... G01R 29/00; G01J 1/42
[52] U.S. Cl. ............................. 324/158 R; 324/57 R; 356/218
[58] Field of Search ............ 324/158 R, 57 R; 356/218, 224, 226

[56] References Cited

U.S. PATENT DOCUMENTS 3,687,558  8/1972  Rex ...................................... 356/218

FOREIGN PATENT DOCUMENTS 3002558  4/1981  Fed. Rep. of Germany .
2428829  6/1978  France .

OTHER PUBLICATIONS

Gill et al; "Measurements of Gain . . . "; Optics Communications; vol. 22; No. 3; Sep. 1977; p. 288.
I.E.E.E. Journal of Quantum Electronics; vol. QE-15; No. 6; Jun. 1979.
Sadighi-Bonabi, R. et al; J. Appl. Phys.; 53(5); May 1982; pp. 3418-3423.
Fujiwara, E. et al; Japanese J. of Appl. Phys.; vol. 20; No. 1; Jan. 1981; pp. L71-L74.

Primary Examiner—Ernest F. Karlsen
Attorney, Agent, or Firm—Handal & Morofsky

[57] ABSTRACT

Device for measuring variations of the gain of a laser amplifier at a particular wavelength, as a function of a pumping energy, said device comprising a source supplying continuous light radiation having the said wavelength and a power Pe, said radiation traversing the amplifier with a given radius, a means for tapping part of the amplified radiation at the output of the amplifier, a photoreceiver receiving said part and measuring the power P̄s thereof throughout the pumping time, a means for forming the quotient of Ps by Pe and supplying a signal G(t) representing the variations of the gain as a function of the pumping time, wherein the device also comprises means for supplying a signal E(t) representing the increase in the pumping energy used during pumping and means for extracting a signal G(E) representing the gain variations as a function of the pumping energy for the given radius from the two signals G(t) and E(t), by elimination of the time t.

It also relates to a process which utilizes this device.

3 Claims, 13 Drawing Figures

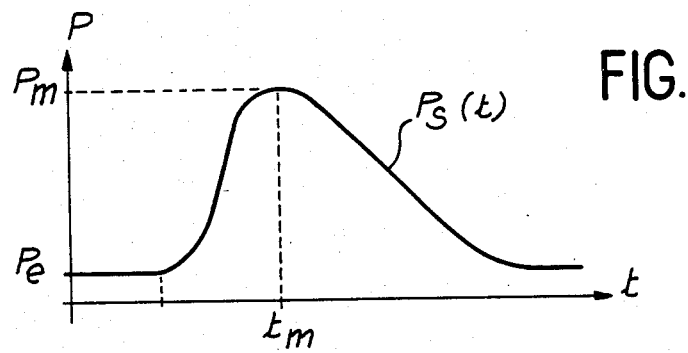
FIG. 3
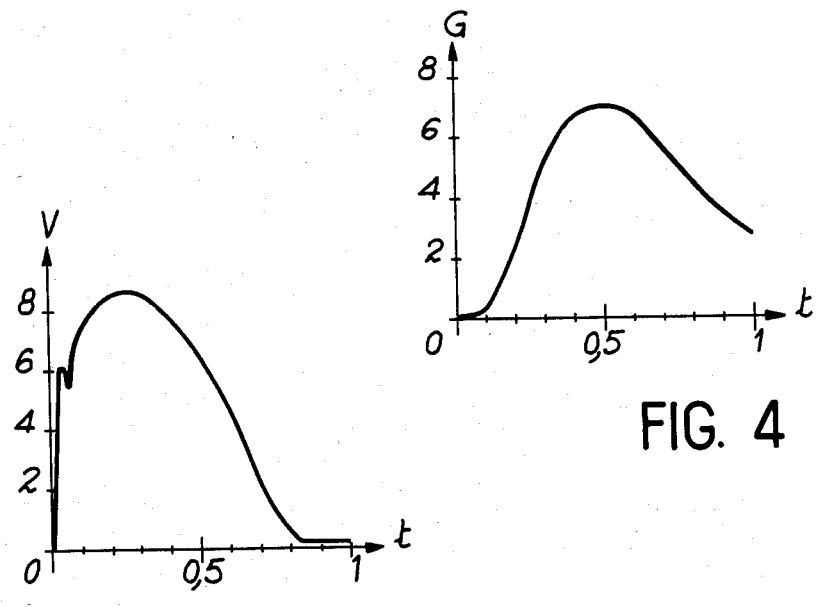
FIG. 4
FIG. 5
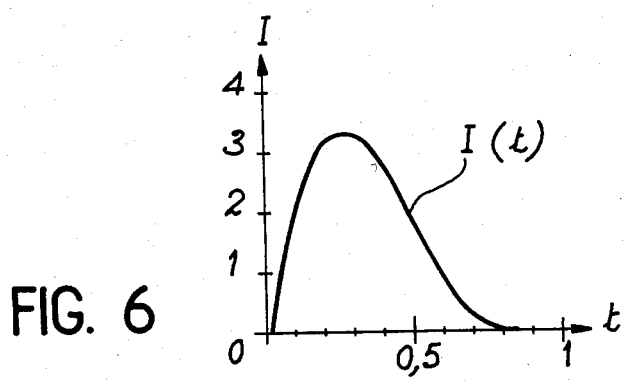
FIG. 6

DEVICE FOR MEASURING THE VARIATIONS IN THE GAIN OF A LASER AMPLIFIER AS A FUNCTION OF THE PUMPING ENERGY AND A PROCESS UTILIZING THIS DEVICE

BACKGROUND OF THE INVENTION

The present invention relates to a device for measuring variations in the gain of a laser amplifier as a function of the pumping energy and to a process utilizing this device. It is used in optics, particularly in the production of laser amplifier chains.

Two processes are known for measuring the gain of a laser amplifier. The means for performing these processes are diagrammatically illustrated in FIGS. 1 and 2.

In the device shown in FIG. 1, it is desired to measure the gain of laser amplifier 10. It conventionally comprises an amplifier bar 12 around which is wound a flash tube 14 supplied with electric power by a circuit 16.

The device also comprises a laser oscillator 20 able to emit light radiation in the form of pulses 22 traversing the amplifier bar 12 at a distance $R_n$ from the axis of the bar. The wavelength of the radiation is that at which measurement of the gain is to take place. The pulse 22 is amplified by bar 12, when the latter is given amplifying characteristics under the action of the optical pumping produced by the flash tube. The output pulse 24 appearing at the amplifier output then has a higher energy level than that of the input pulse 22.

The system also comprises two semi-transparent plates 31, 32, placed respectively at the input and output of the amplifier bar 12 and two photosensitive detectors 33, 34 (calorimeters, photoelectric cells, etc) able to measure light energy.

A device of this type functions in the following manner. Plates 31 and 32 sample part of the input and output pulses 22, 24 respectively and transfer said part to detectors 33, 34, which measure the corresponding energy levels. The measurement of the ratio of these energies immediately gives the gain of bar 12 for the pumping energy value used and for the considered radius $R_n$.

A number of measurements of this type for several values of E must be performed to obtain variations G(E) of the gain, as a function of the pumping energy E.

The second process is illustrated in FIG. 2, where the represented device also comprises a laser amplifier 10 whose gain is to be measured and a laser oscillator 40 which functions continuously, unlike the laser 20 of the preceding device. This laser emits radiation at the amplification wavelength of bar 12. When the latter is, for example, a neodynium-doped glass bar, laser 40 can, for example, be of the YAG type.

The represented device also comprises a beam splitter plate 42, a photoelectric detector 44 and a divider 46 of the signal supplied by detector 44 by a quantity proportional to the power supplied by laser 40.

The operation of this device is illustrated by means of the graph of FIG. 3 showing the variations in time of the signal supplied by detector 44. This signal represents the luminous power Ps(t) measured at the output of amplifier 10 for radius $R_n$. When there is no optical pumping, this power is equal to the value Pe of the input radiation emitted by laser 40.

During pumping, the power Ps(t) increases up to a maximum value Pm, which is reached at a time tm and then decreases once again towards Pe. Thus, the gain of the amplifier bar, which is equal to the quotient Ps(t)/Pe varies as a function of time throughout the duration of the pumping pulse and passes through a maximum equal to Pm/Pe at time t=tm.

As in the case of the previously described device, when it is desired to obtain variations of the gain as a function of the pumping energy E, it is necessary to perform several measurements for different energy levels E and on each occasion sample the corresponding gain value, e.g. the maximum gain.

Compared with the previous process, this process has the advantage of permitting the determination of the time at which the gain is at a maximum, thereby making it possible to synchronize the various amplifiers of a laser chain.

The two prior art processes described hereinbefore have the disadvantage of requiring several pumping operations or "shots" for covering the complete desired energy range. This necessarily increases the measuring time. In addition, it reduces the life of the element to be measured.

BRIEF SUMMARY OF THE INVENTION

The present invention relates to a device and to a process obviating the two disadvantages referred to hereinbefore, because they make it possible to obtain the sought gain variations as a function of the pumping energy in a single "shot", i.e. in a single pumping operation. To this end, the device is of the type described with reference to FIG. 2 and is characterized in that it also comprises means for supplying a signal E(t) representing the increase in the pumping energy used during pumping and means for extracting from the two signals G(t) and E(t), by elimination of the time t, a signal G(e) representing the variations of the gain as a function of the pumping energy.

The present invention also relates to a process for utilizing the device defined hereinbefore. This process consists firstly (as in the second prior art process described hereinbefore) of recording the variations G(t) of the gain as a function of time for a fixed pumping energy and, unlike in the prior art, simultaneously recording the variations of the pumping energy E(t) used all along the pumping pulse. This is followed by the determination of the gain variations G(E) as a function of energy E by eliminating the time parameter between the two functions G(t) and E(t). Thus, the gain variations in the interval between 0 and the total energy used are obtained directly and in one shot. The total energy used must be naturally chosen sufficiently high for the interval in question to cover the desired range.

BRIEF DESCRIPTION OF THE DRAWINGS

Exemplified and non-limitative embodiments of the invention will now be described with reference to the attached drawings, wherein show (following onto the already described FIGS. 1 to 3):

FIG. 4 a graph illustrating the variations in gain of a laser amplifier as a function of time for a given pumping energy for a radius $R_n$.

FIG. 5 a graph illustrating the variations of the exciting voltage of the flash tube as a function of time.

FIG. 6 a graph illustrating the variations of the exciting current of the flash tube as a function of time.

DETAILED DESCRIPTION OF THE PREFERRED EMBODIMENTS

As stated hereinafter, the determination according to the invention of variations in the gain as a function of the pumping energy passes via the prior determination of the gain variations G(t) as a function of time and those E(t) of the pumping energy as a function of said time. The graph of FIG. 4 shows the variations G(t) in a system of axes in which the time appears on the abscissa (scale 0.1 ms per division) and the gain G on the ordinate (and expressed in dB), this applying to a particular amplifier. The curve is obtained on the basis of the results illustrated by FIG. 3 by taking as the gain value the quotient of the output power Ps(t) of the amplifier by the input power Pe. This first determination can be carried out as in the prior art.

The invention also involves the simultaneous measurement of the variations of the voltage V(t) and current I(t) applied to the flash tube. These variations are respectively illustrated in FIGS. 5 and 6, where the time is once again plotted on the abscissa with the same scale (0.1 ms per division), with the voltage and current on the ordinate, once again for the particular amplifier in question. The scale of the voltages is 1 kV per division and that of the currents 5 kA per division.

Figure 7:
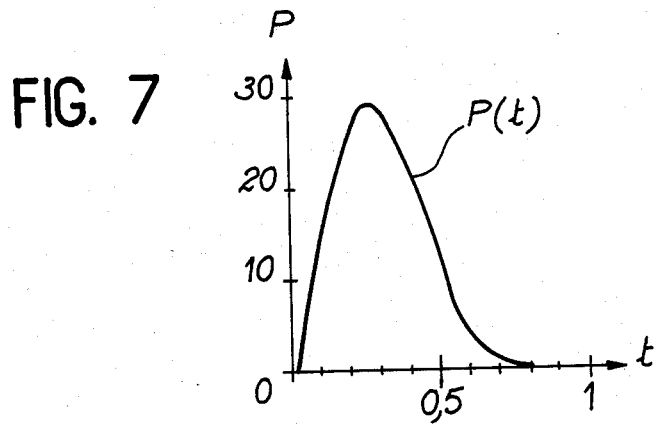
FIG. 7 a graph illustrating the variations of the electric power dissipated in flash tube as a function of time.

FIG. 7 shows the electric power P(t) obtained by the formation of the product V(t).I(t). The scale of the powers is in the illustrated case 30 MW per division, whilst that of the time is still 0.1 ms per division.

Figure 8:
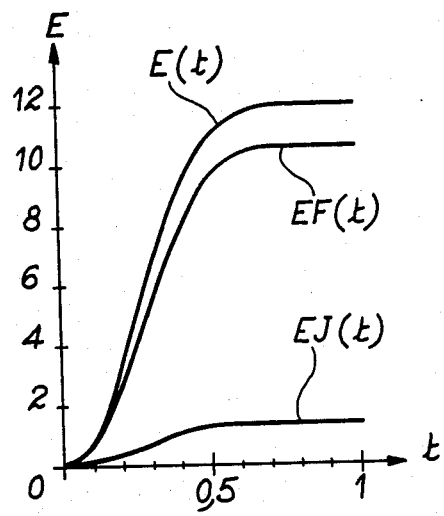
FIG. 8 a diagram illustrating the variations of the different energy levels used and in particular the pumping energy.

The time integration of this power makes it possible to determine the energy increase, i.e. EF(t) dissipated in the flash tube. To obtain the total energy E(t), it is necessary to add to EF(t) the energy EJ(t) dissipated by the Joule effect in the supply circuit and the flash tube and which is not involved in the optical pumping. The variations of these three energies are shown on the graph of FIG. 8 in which the time is still plotted on the abscissa (0.1 ms per division) and the energy on the ordinate (1 kJ per division).

Figure 9:
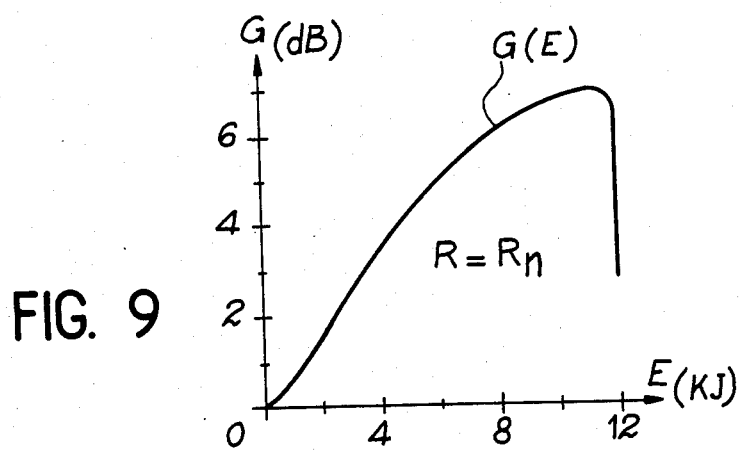
FIG. 9 the variations of the gain as a function of the pumping energy for a radius $R_n$.

According to the invention, on the basis of the signals G(t) (FIG. 4) and E(t) (FIG. 8), by elimination of the time t, it is possible to extract a signal G(E) which is represented by the curve of FIG. 9 in which the energy E is plotted on the abscissa (1 kJ per division) and the gain G on the ordinate (1 dB per division) for a radius $R_n$ of bar 12. According to the invention, this curve is obtained in a single shot.

Figure 1:
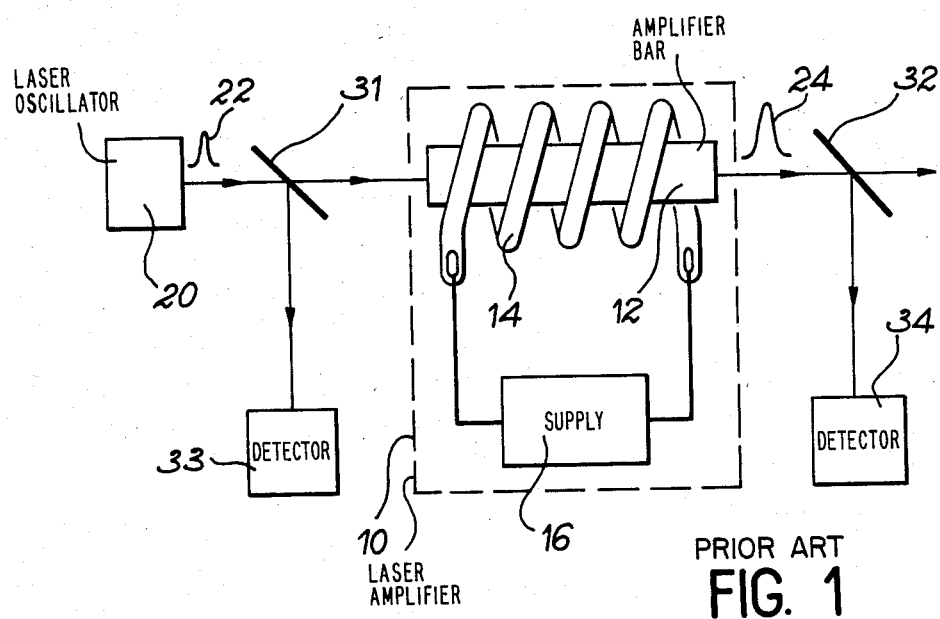
Figure 2:
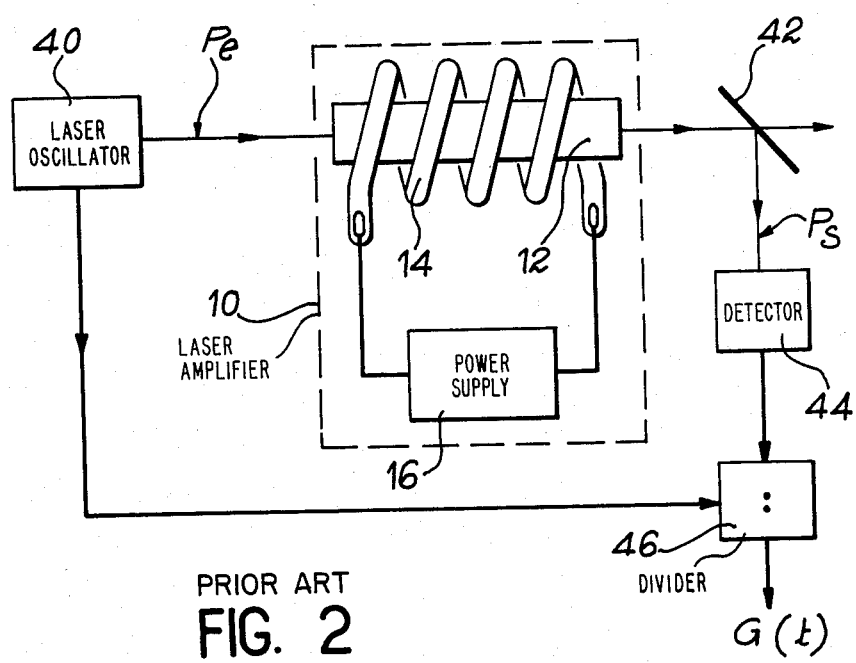
Figure 10:
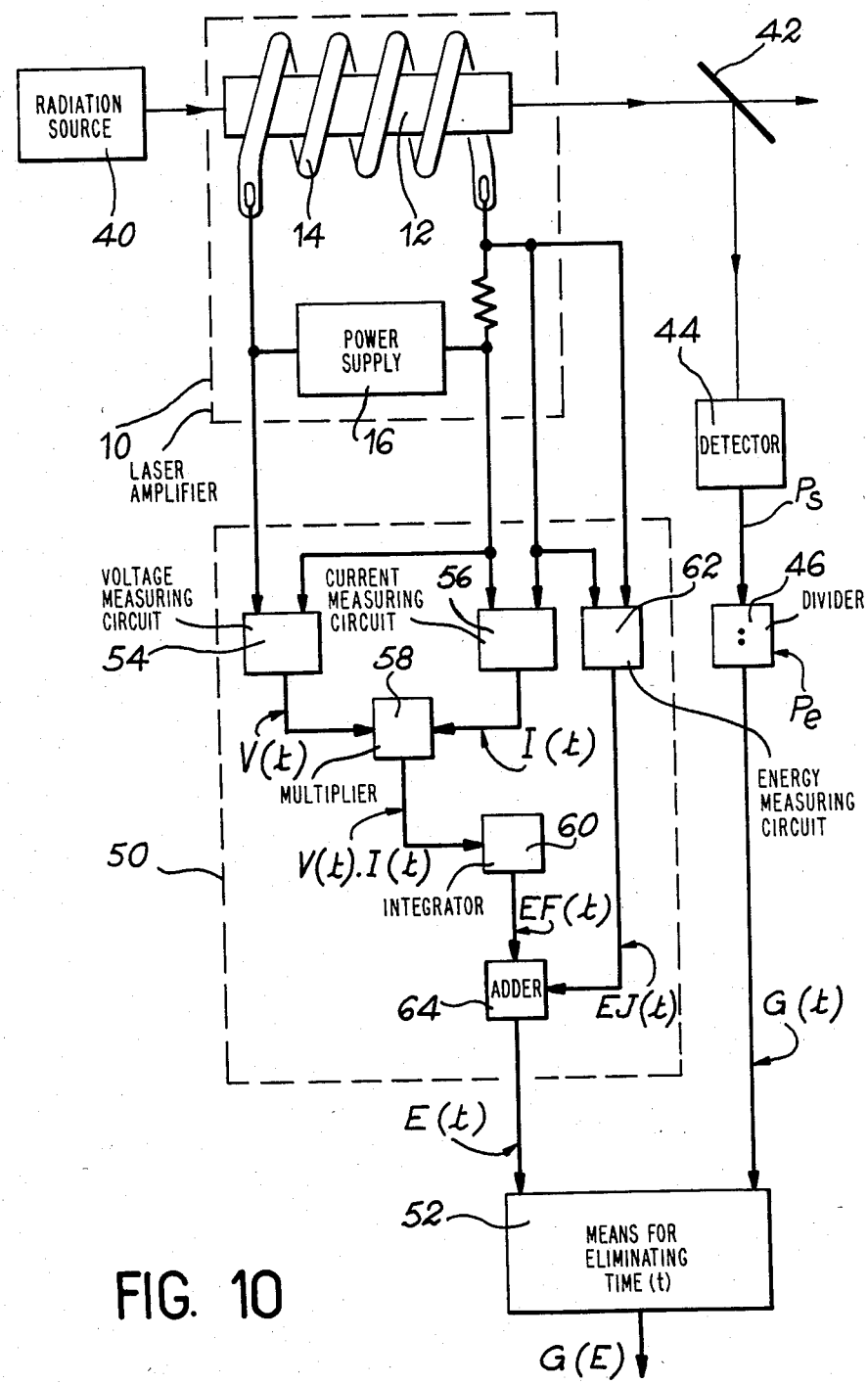
FIG. 10 diagrammatically, means for performing the process according to the invention.

The means making it possible to perform the process described hereinbefore are illustrated in FIG. 10. They firstly comprise, as in the prior art illustrated by FIG. 2, a continuous radiation source 40 functioning at the measuring wavelength and which emits a power Pe. This radiation passes through amplifier 12, whose gain is to be measured. A means 42 is used for tapping part of the amplifier radiation at the output of the amplifier, said means generally being a semi-transparent plate. A photoreceiver 44 receives the tapped part and measures the output power Ps throughout the optical pumping time. Finally, circuit 46 forms the quotient of Ps by Pe and supplies a signal G(t) representing the gain variations as a function of time during pumping.

The device of FIG. 10 also comprises means 50 for measuring the increase E(t) in the pumping energy and means 52 for extracting the sought signal G(E) from the two signals G(t) and E(t), by elimination of the time t.

In the illustrated embodiment, means 50 comprises a circuit 54 for measuring the supply voltage V(t) of flash tube 14, a circuit 56 for measuring the current I(t) circulating in the flash tube, a multiplier 58 connected to the two aforementioned circuits and supplying a product signal P(t)=V(t).I(t), and integrator 60 connected to multiplier 58 and supplying a signal EF(t) representing the pumping energy of the flash tube, a circuit 62 determining the energy EJ(t) lost by the Joule effect in the pumping circuit, by determining the product $Ri^2 dt$ of the equivalent resistance R of current i during a time interval dt and integration of said product and an adder 64 connected to the last-mentioned circuit 62 and to integrator 60 and supplying the sought signal E(t).

The complete calculating or computing chain described hereinbefore can be either of an analog, a digital or a hybrid digital-analog type.

In what has been described hereinbefore, the measuring light beam has a low power, so that the measured gain is a "small signal" gain. Moreover, the diameter of the beam is generally much smaller than that of the laser amplifier, so that the measured gain is the gain at a clearly defined distance from the amplifier axis $R_n$. However, it is easy to extend the scope of the invention in the case where the beam emitted by the laser oscillator occupies a significant fraction of the cross-section of the amplifier bar, in which case the measurement can be carried out simultaneously at a plurality of points.

Figure 11A:
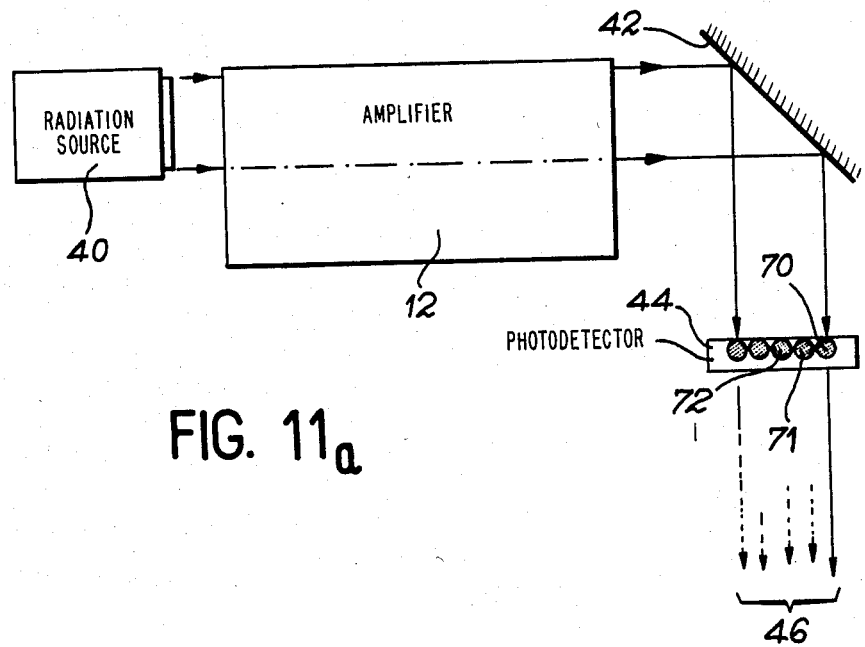
FIGS. 11a and 11b a variant with a plurality of photoreceivers, distributed along a radius of the amplifier.
Figure 11B:
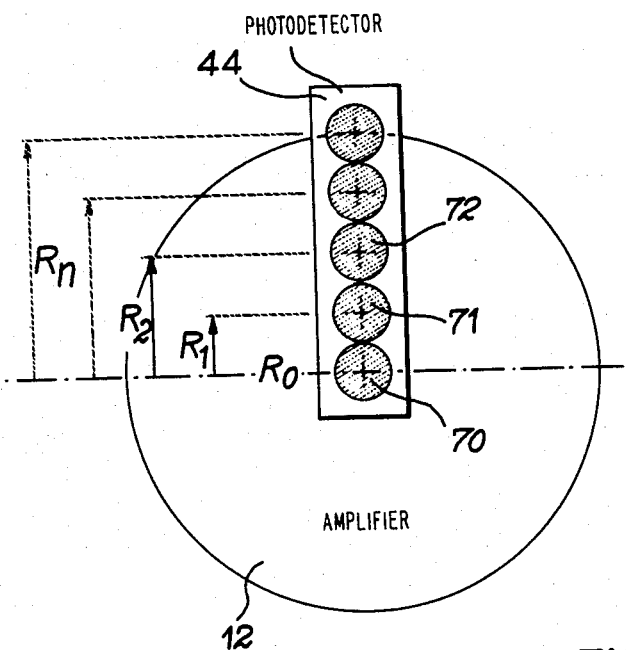

It is of interest to use a measuring beam, whose diameter is equal (or slightly larger) than the radius of the bar to be measured and the reception means distributed along a radius of the amplifier bar. This case is shown in FIGS. 11a and 11b, where it is possible to see a plurality of photoreceivers 70, 71, 72, etc distributed along a radius at distances from the axis equal to $R_0, R_1, R_2 \ldots R_n$. These photodetectors can be photodiodes or elements of a strip of the Reticon type.

Figure 12:
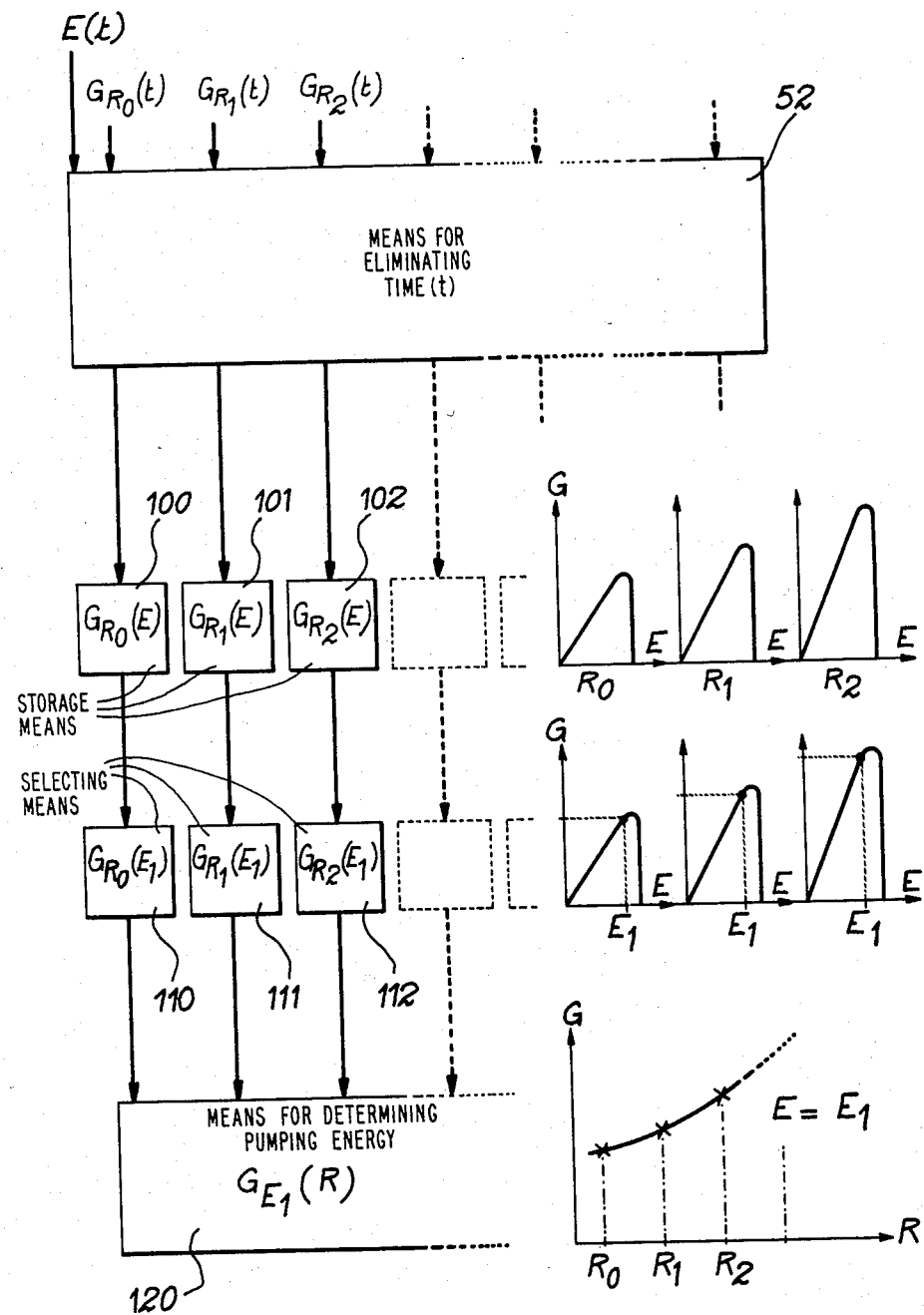
FIG. 12 supplementary processing means making it possible to determine gain variations as a function of the radius.

FIG. 12 shows auxiliary processing means making it possible to bring about optimum use of the device of FIG. 12 having a plurality of photodetectors. The time elimination means 52 receives, besides signals E(t), the same number of signals G(t) as there are photoreceivers, namely $G_{R0}(t)$, $G_{R1}(t)$, $G_{R2}(t)$, etc. Instead of having only a single output supplying a signal G(E), means 52 has the same number of outputs as there are photoreceivers. These outputs supply signals representing the variations $G_{R0}(E)$, $G_{R1}(E)$, $G_{R2}(E)$ of the gain as a function of the energy for the different radii $R_0$, $R_1$, Rhd 2, etc. These results are stored in means 100, 101, 102, etc (cf the curves to the right of means 100, 101, 102, etc).

Means 110, 111, 112, etc connected directly to means 100, 101, 102, etc are able to determine for each radius $R_0$, $R_1$, $R_2$, etc the gain value for a particular energy ($E_1$). These different values are received by a means 120, which determines for said pumping energy value $E_1$, the variations of the gain $G_{E1}(R)$ as a function of the radius (R) (cf the curve shown to the right of means 120).

What is claimed is:

1. A device for measuring variations of the gain of a laser amplifier during a pumping time, at a particular wavelength, as a function of a pumping energy, said device comprising an optical source generating continuous light radiation and having an output coupled to the laser amplifier, said radiation having said particular wavelength and a power Pe, measurement means responsive to said optical source for measuring said power Pe, said radiation traversing the amplifier with a given radius, a tapping means for sampling part of the amplified radiation positioned at the output of the amplifier, a photoreceiver receiving said sampled part and measuring a power Ps corresponding to said part over the pumping time, quotient means responsive to said measurement means and said photoreceiver for forming the quotient of Ps divided and generating a signal $G(t)$ representing variations of gain as a function of time, a voltage measuring circuit connected to a power supply of the laser amplifier for measuring the supply voltage $V(t)$, a current measuring circuit connected to the power supply of the laser amplifier for measuring the supply current $I(t)$, a multiplier circuit connected to said voltage measuring and current measuring circuits for generating a signal $P(t)$ that is substantially equal to the product $V(t)$ times $I(t)$, an intergrater circuit connected to the output of said multiplier for generating a signal $EF(t)$, an energy measuring circuit connected the power supply of the laser amplifier for generating the signal $EJ(t)$, an adder circuit connected to said energy measuring circuit and to said intergrater circuit for generating a signal $E(t)$, extraction means for eliminating the time dependence between the signal $G(t)$ and $E(t)$, and for generating a signal $G(E)$ representing the gain variations as a function of the pumping energy for the given radius from the two signals $G(t)$ and $E(t)$.

2. A device according to claim 1, wherein said optical source supplies a light beam having a diameter which is at least equal to the radius of the laser amplifier, said photoreceiver comprising a plurality of photoreceiver elements disposed along a line with a length equal to the radius of the amplifier and distributed at distances $R_0$, $R_1$, $R_2$ ... $R_n$ corresponding to n different radii from the amplifier axis, said photoreceiver together with said quotient means generating and supplying to said extraction means the signals $G_{R0}(t)$, $G_{R1}(t)$, $G_{R2}(t)$, said extraction means generating corresponding signals $G_{R0}(E)$, $G_{R1}(E)$, $G_{R2}(E)$ representing the variations of the gain for the different values $R_0$, $R_1$, $R_2$, etc.

3. A device according to claim 2, wherein said device further comprises storage means for storing the signals $G_{R0}(E)$, $G_{R1}(E)$, $G_{R2}(E)$ etc., generated by said extraction means, selection means connected to said storage means for determining the values $G_{R0}(E_1)$, $G_{R1}(E_1)$, $G_{R2}(E_1)$ assumed by the gain for a particular energy $E_1$, and means for determining the variations of the gain $G_{E1}(R)$ along the radius of the amplifier for said energy.

* * * * *